March 24, 1964 H. C. SWIFT 3,126,074
AUTOMATIC BRAKE ADJUSTING MECHANISM
Filed Nov. 23, 1962 2 Sheets-Sheet 1
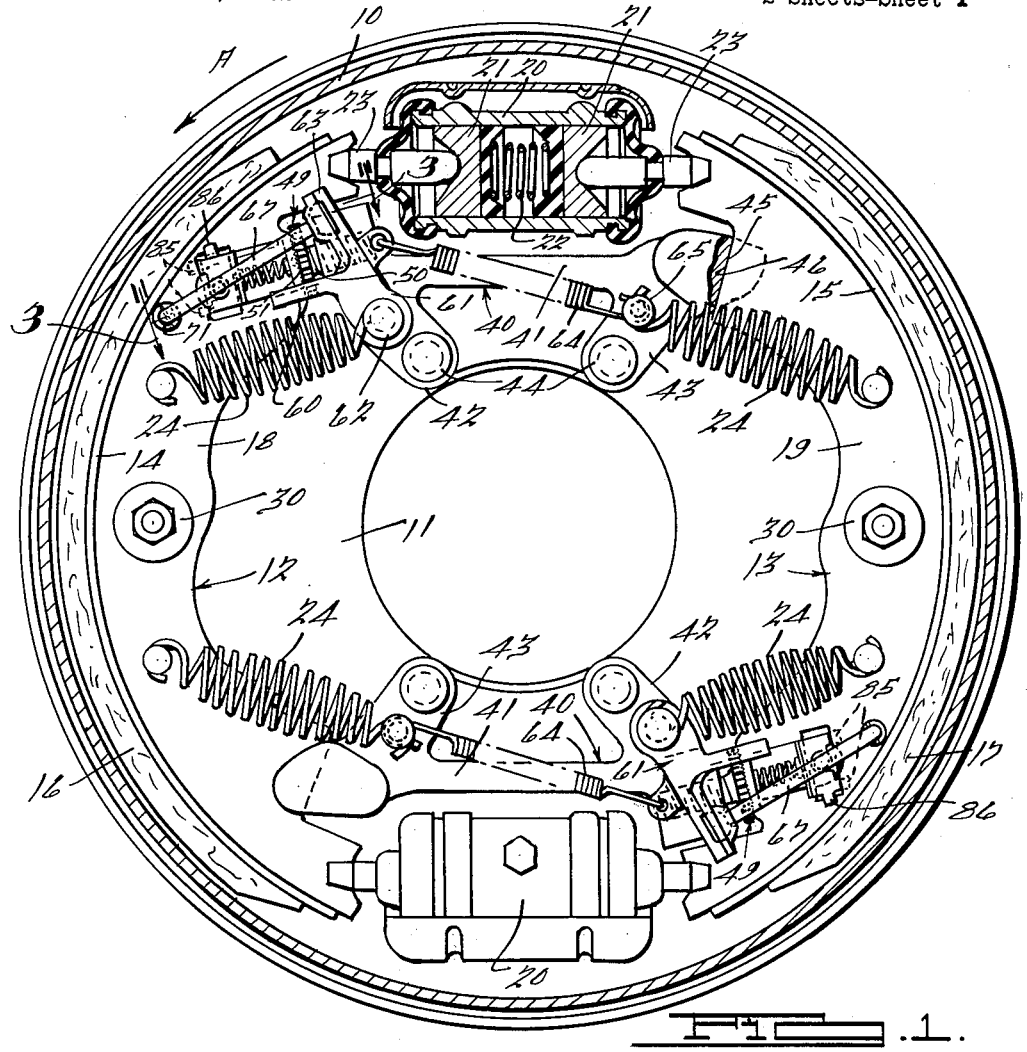
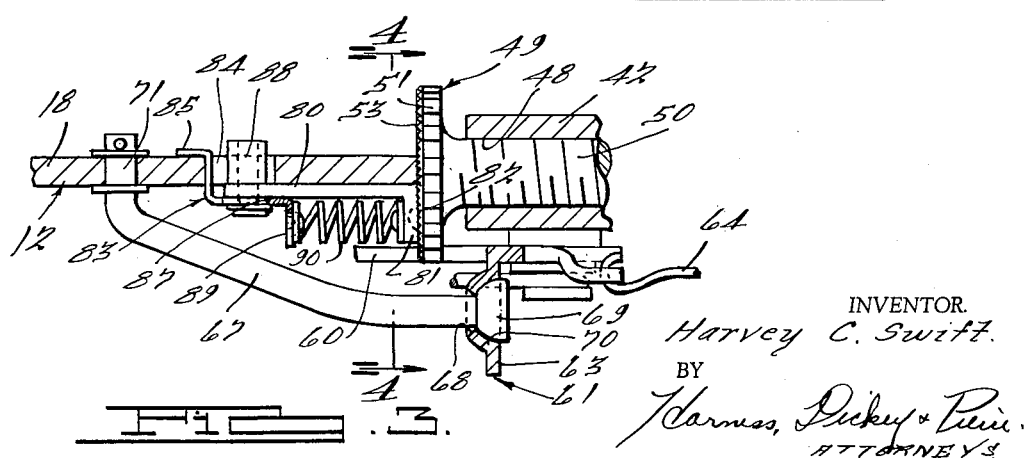
INVENTOR.
Harvey C. Swift.
BY
Harness, Dickey & Pierce
ATTORNEYS

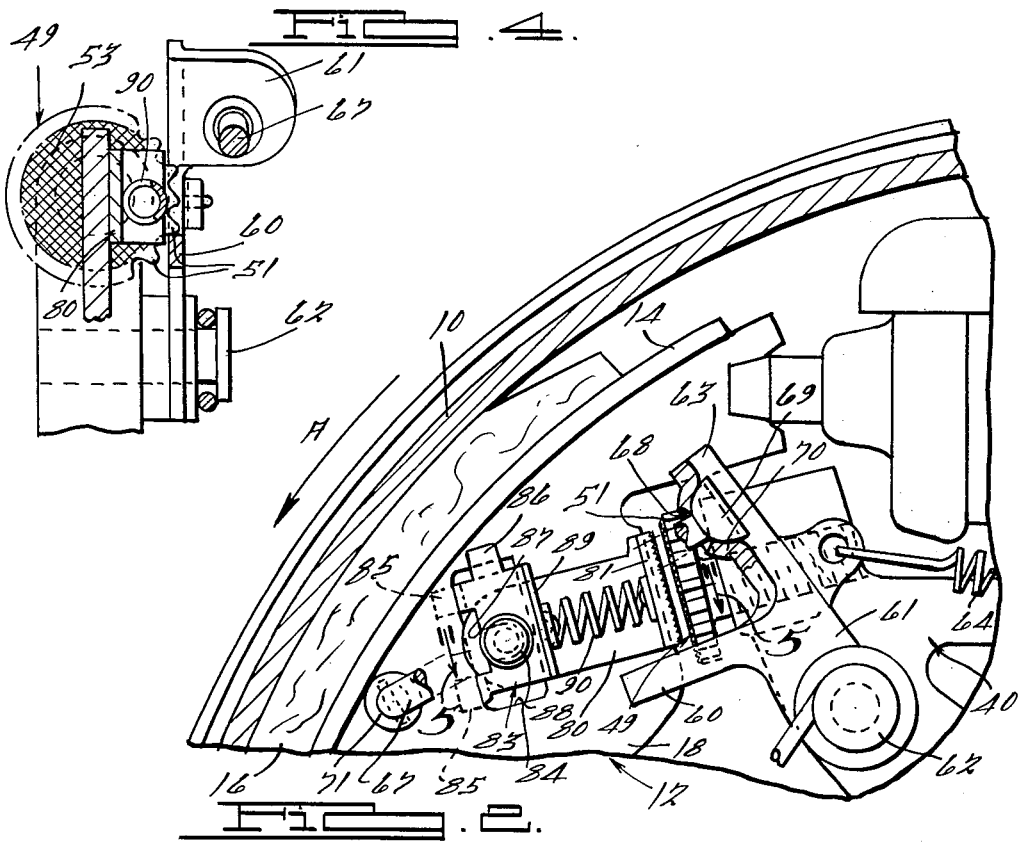
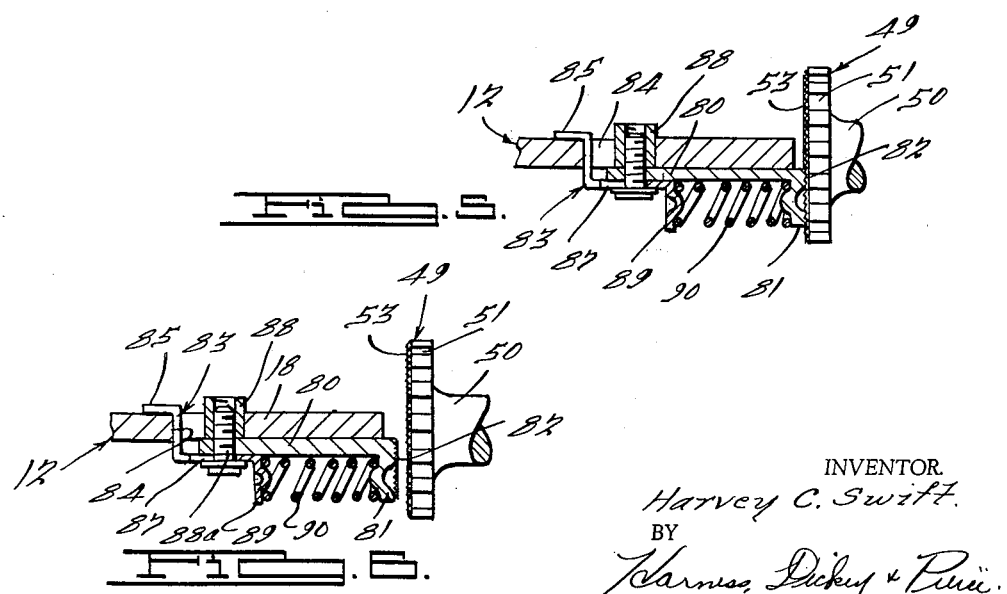

United States Patent Office 3,126,074
Patented Mar. 24, 1964

3,126,074
AUTOMATIC BRAKE ADJUSTING MECHANISM
Harvey C. Swift, Birmingham, Mich., assignor to Kelsey-Hayes Company, Romulus, Mich., a corporation of Delaware
Filed Nov. 23, 1962, Ser. No. 239,630
10 Claims. (Cl. 188—79.5)

This invention relates to brakes of the type comprising an annular brake drum and arcuate brake shoes and, more particularly, to means for automatically adjusting the brakes when the wear on the brake shoes requires such adjustment.

One of the objects of this invention is to provide automatic adjusting means controlled by excessive movement of the shoe being adjusted due to wear on the brake lining thereof.

Another object of this invention is to provide an automatic adjuster for the brake shoes adapted to prevent overadjustment of the brake shoes under all conditions.

A further object of the invention is to provide automatic adjusting means of this type which is rendered operative when the vehicle is moving in a forward direction, but which does not affect the normal operation of the brake when applied during the forward movement of the vehicle.

Another object of the invention is to provide a device of this type wherein its structural simplicity produces a substantial economy in its manufacturing, installation and maintenance costs.

The various objects and advantages, and the novel details of construction of one commercially practical embodiment of the invention will become more apparent as this description proceeds, especially when considered in connection with the accompanying drawings, in which:

FIGURE 1 is a sectional elevational view of a brake incorporating the features of this invention, the brake shoes being shown in released position;

FIGURE 2 is an enlarged fragmentary view, similar to FIGURE 1, with the brake shoes applied and with the automatic adjusting means in position to function;

FIGURE 3 is a fragmentary sectional, elevational view taken substantially on the plane indicated by line 3—3 in FIGURE 1;

FIGURE 4 is a fragmentary sectional elevational view taken substantially on the plane indicated by line 4—4 in FIGURE 3;

FIGURE 5 is a detail sectional view taken on line 5—5 of FIGURE 2 with the locking device in engagement with the adjustable anchor; and FIGURE 6 is a similar view showing the locking device in released position.

The illustrative embodiment of the invention is shown in the drawings as applied to a brake structure of the internal expanding type comprising arcuate brake shoes adapted to cooperate with the inner surface of a brake drum. The environment in which the invention is illustrated is shown in FIGURE 1, in which the reference character 10 indicates a brake drum which is mounted on a wheel hub (not shown) for rotation therewith. A stationary backing plate 11 is mounted on a stationary part of the vehicle (not shown).

In addition to the elements already described, the basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15.

A hydraulic wheel or brake cylinder 20 is interposed between each pair of adjacent ends of the brake shoes 12 and 13. These wheel cylinders are of conventional construction, each comprising a pair of pistons 21 urged apart by a light spring 22. The pistons 21 operate plungers 23, extending from opposite ends of the cylinder for engagement with the webs 18 and 19 and providing the actuating means for moving the brake shoes 12 and 13 into engagement with the brake drum 10. Hydraulic fluid is delivered to the brake cylinders 20 between the pistons 21 from a conventional brake pedal operated master cylinder (not shown). Retraction springs 24 normally retain the ends of the brake shoes in engagement with the plungers 23 and with the stationary and adjustable anchors yet to be described.

Each brake shoe is guided and held in proper relation to the backing plate 11 by means of a conventional hold-down device 30.

The structure thus far described is substantially conventional and the features which form the subject matter of the present invention will now be described in detail. This invention relates to means for automatically adjusting the brake shoes when adjustment is necessary due to wear on the brake linings thereof and to provide means for preventing overadjustment of the brake shoes under all conditions.

The structure about to be described is duplicated at both ends of the brake shoes so that automatic adjustment of both shoes of the brake assembly is provided for.

For the purposes of this description, reference will be made to the automatic adjusting means shown at the upper portion of the brake assembly illustrated in FIGURE 1 and in FIGURE 2.

Secured to the backing plate 11 is a torque-taking or torque-resisting member 40 which consists essentially of a transverse strut 41 connecting spaced arms 42 and 43. The torque-resisting member is secured to the backing plate by means of rivets, bolts, or the like 44 so as to be rigid therewith. The arm 43 is provided with a slot or recess 45 acting as a fixed anchor to receive the end of the brake shoe web as indicated at 46 in FIGURE 1. The other arm 42 of the torque-resisting member 40 is provided with a threaded opening 48 adapted to receive an adjustable anchor 49. The adjustable anchor consists of an adjusting screw or threaded shank 50 threadedly received in the threaded opening 48 and a flat head in the form of a toothed gear or star wheel having peripheral teeth 51 and a flat top surface which is knurled or otherwise roughened as at 53 (see FIGURE 3). The head 51 of the adjustable anchor 49 is adapted to engage the adjacent portion of the web 18 of the adjacent brake shoe 12 so that when the adjustable anchor is actuated in one direction to move the threaded shank 50 out of the threaded recess 48, the brake shoe 12 will be adjusted towards the brake drum to take up any wear in the lining 16 thereof.

The teeth 51 of the toothed or star wheel are adapted to be engaged by the pawl portion 60 of an adjusting lever 61 pivotally mounted by a pivot pin or bolt 62 to the arm 42. The adjusting lever 61 is substantially in the form of a bellcrank, being provided with a laterally extending arm 63. The pawl 60 is biased in the direction in which it will engage the teeth 51 of the adjustable anchor by means of a spring 64 interposed between the arm 63 and a pin 65 carried by arm 43 of member 40. When the spring 64 functions to swing the lever 61 about its pivot 62, the pawl 60 thereof will engage a tooth and rotate the threaded shank 50 in a direction to move the brake shoe toward the brake drum.

The adjusting lever 61 is operatively connected to its brake shoe by means of a link 67 which passes through an opening 68 formed in the arm 63 of adjusting lever 61 and is provided with a semirounded head 69 which engages a socket 70 in the arm 63 to slidably connect this end of the link 67 to the arm 61 for movement of the arm 61 during movement of the link 67 in one direction; i.e., to the left in FIGURES 1 and 3. The other end of the link 67 is pivotally connected as at 71 to the web 18 of the brake shoe. Thus, when the brake shoe moves in the direction of arrow A, motion will be transmitted from the brake shoe through the link 67 to the adjusting lever 61 to rock the same about its pivot 62 to actuate the pawl 60 to cock or move the same to operative position against the action of spring 64, whereupon in its subsequent movement, influenced by the spring 64, it will engage one of the teeth 51 to rotate the screw 50 to adjust the adjustable anchor 49.

It will be understood that when the brake shoe 12 (in FIGURES 1 and 2) moves in the direction of arrow A, which it does when the brake are applied and the vehicle is moving in a forward direction, the pawl 60 will be positioned behind one of the teeth 51 of the adjustable anchor 49 so that when the adjustable anchor is unlocked, the adjusting lever 61 can rotate the adjustable anchor one tooth space to adjust the brake shoe. As will be later described, this occurs when the brake lining has become worn and, as a consequence, the brake shoe partakes of excessive movement during the application of the brakes when the vehicle is moving in a forward direction.

The slidable connection between the link 67 and the adjusting lever 61 permits the adjusting lever to remain in cocked or operative position and relative movement between the adjusting lever 61 and the link 67 during the normal application of the brakes.

It is an important feature of this invention to provide automatic adjusting means having means for preventing overadjustment of the brake under all conditions. This invention provides means for permitting adjustment of the brake shoe only when there is excessive movement of the brake shoe due to wear on the lining thereof.

This latter means (see particularly FIGURES 3, 5 and 6) comprises a locking member 80 slidably mounted on the web 18 of the brake shoe 12 and provided with a laterally extending end portion 81 having a roughened surface as at 82 adapted to engage the knurled surface 53 of the adjustable anchor 49. For slidably mounting the locking device 80 there is provided a spring clip member 83 which may be in the form of a stamping, which extends through an aperture 84 in the web 18 of the brake shoe 12 and is held in place by ears 85 and 86 extending on opposite sides of the brake shoe web 18. The spring clip member 83 is provided with an open ended slot 87 which receives the fastening screw 88a of a stud or pin 88 rigidly secured to the locking member 80. The clip member 83 is provided with an upstanding portion 89 which forms an abutment for a spring 90, the other end of which engages the laterally extending portion 81 of the locking member 80.

The spring 90 normally urges the locking member 80 to the right, as viewed in FIGURES 1 and 3. However, in this position of the parts, the pin or stud 88 extends freely through the slot 84 in the web of the brake shoe and the laterally extending portion 81 engages the knurled surface 53 of the adjustable anchor to prevent adjustment of the anchor. When, however, the brake shoe 12 moves in the direction of arrow A an excessive amount, due to wear on the brake shoe lining 16, the locking device 80 will be moved from the position illustrated in FIGURES 1, 3 and 5, to the position illustrated in FIGURE 6.

During normal operation of the brakes, the pin or stud 88 will move in the slot 84 from the position illustrated in FIGURE 3 to the position illustrated in FIGURE 5 and the locking device 80 will remain in engagement with the knurled portion 53 of the anchor 49. However, upon excessive movement of the brake shoe, due to wear on the lining thereof, the locking device 80 will be moved from the position shown in FIGURE 5 to that shown in FIGURE 6 in which the locking device 80 is disengaged from the adjustable anchor so that the adjusting arm 61, through its pawl 60, may adjust the anchor and thereby adjust the brake shoe to compensate for the lining wear.

The width of the slot 84 permits normal operation of the brake shoe without releasing the locking member 80, and the slidable connection between the link 67 and the adjusting lever 61 provides for movement of the link 67 during normal operation of the brake without moving the arm 61. When, however, there has been excessive movement of the brake shoe, due to wear on the lining thereof, the right-hand side of the slot 84 (FIGURE 3) will engage the stud or pin 88 and move the locking device from the position illustrated in FIGURE 5 to that illustrated in FIGURE 6 to release the adjustable anchor so that the pawl 60, which has previously been moved to an operative position, may, under the influence of spring 64, rotate the adjusting arm 61 to engage the teeth 51 on the adjustable anchor to adjust the anchor, as will be apparent.

From the foregoing, it will be seen that during normal operation of the brake, the locking device 80 prevents adjustment of the adjustable anchor, and it is only when the brake shoe partakes of excessive movement, due to wear on its lining, that the locking device will be released to permit adjustment of the anchor.

As previously mentioned, the structure just described in detail is duplicated at the diametrically opposite side of the brake, as shown at the bottom of FIGURE 1, in which instance the operation of the adjusting lever 61 and the locking device 80 is controlled by the other brake shoe 13.

The vehicle, during its forward movement, rotates the brake drum and also the brake shoe in the direction of arrow A. The adjusting lever 61 is moved to operative position when the brakes are applied and the vehicle is moving in a forward direction, and the locking device is released and the adjustment made when the vehicle is moving in a forward direction.

While a commercially practical embodiment of the invention has been described and illustrated herein somewhat in detail, it will be understood that various changes may be made as may come within the purview of the accompanying claims.

What is claimed is:

1. In a vehicle brake comprising a brake shoe, a brake drum, a torque-resisting member, means for moving said brake shoe into engagement with said brake drum, and an adjustable anchor carried by said torque-resisting member adapted for engagement by said brake shoe, that improvement which comprises, means mounted on the brake shoe normally locking said anchor to prevent adjustment thereof, an adjusting member for adjusting said anchor, a link directly connecting said adjusting member to said brake shoe whereupon movement of said brake shoe in a forward direction will move said adjusting member to an operative position with respect to said anchor, and a lost motion connection between said brake shoe and locking means actuated by excessive movement of said brake shoe in the same direction for releasing said locking means to permit adjustment of said anchor.

2. A brake comprising a brake shoe having a brake lining, a rotatable brake drum, a torque-resisting member, means for moving said brake shoe into engagement with said brake drum, an adjustable anchor carried by said torque-resisting member adapted for engagement by said brake shoe, a pivotally mounted adjusting lever functioning as a pawl for adjusting said anchor, link means directly connecting said adjusting lever to said brake shoe whereby movement of said brake shoe in a forward direction will move said adjusting lever to operative position with respect to said anchor, releasable means mounted on said brake shoe normally locking said anchor to prevent adjustment thereof, and a lost motion connection between said brake shoe and locking means actuated by excessive movement of said brake shoe in the same direction for releasing said locking means to permit said adjusting lever to adjust said anchor.

3. A brake comprising a brake shoe having a brake lining, a rotatable brake drum, a backing plate, a torque-resisting member mounted on said backing plate, means for moving said brake shoe into engagement with said brake drum, an adjustable anchor carried by said torque-resisting member adapted for engagement by said brake shoe, an adjusting lever pivotally mounted on said torque-resisting member and functioning as a pawl for adjusting said anchor, a link slidably connected to said adjusting lever and pivotally connected directly to said brake shoe whereby movement of said brake shoe upon application of the brake while the vehicle is moving in a forward direction will move said adjusting lever to an operative position with respect to said anchor, means mounted on said brake shoe normally locking said anchor to prevent adjustment thereof, and a pin and slot connection between said brake shoe and locking means actuated by excessive movement of said brake shoe, due to wear on the brake lining, upon application of the brake while the vehicle is moving in a forward direction, for releasing said locking means to permit said adjusting lever to adjust said anchor.

4. A brake comprising a brake shoe having a brake lining, a rotatable brake drum, a torque-resisting member, means for moving said brake shoe into engagement with said brake drum, an adjustable anchor carried by said torque-resisting member adapted for engagement by said brake shoe, said adjustable anchor comprising a threaded member having a head provided with peripheral teeth and a flat roughened surface, a pivotally mounted adjusting lever functioning as a pawl for adjusting said anchor, means connecting said adjusting lever to said brake shoe whereby movement of said brake shoe in one direction will move said adjusting lever to operative position with respect to said anchor, means mounted on said brake shoe normally locking said anchor to prevent adjustment thereof, and a lost motion connection between said brake shoe and locking means actuated by excessive movement of said brake shoe in the same direction for releasing said locking means to permit said adjusting lever to adjust said anchor, said locking and releasing means comprising a locking member slidably mounted on said brake shoe engaging the flat roughened surface of said head.

5. A brake comprising a brake shoe having a brake lining, a rotatable brake drum, a torque-resisting member, means for moving said brake shoe into engagement with said brake drum, an adjustable anchor carried by said torque-resisting member adapted for engagement by said brake shoe, a pivotally mounted adjusting lever functioning as a pawl for adjusting said anchor, said adjustable anchor comprising an adjusting screw having a head provided with peripheral teeth adapted to be engaged by the adjusting lever pawl, and provided with a top surface which is knurled, means connecting said adjusting lever to said brake shoe whereby movement of said brake shoe in one direction will move said adjusting lever to operative position with respect to said anchor, means mounted on said brake shoe normally locking said anchor to prevent adjustment thereof, and a lost motion connection between said brake shoe and locking means actuated by excessive movement of said brake shoe in the same direction for releasing said locking means to permit said adjusting lever to adjust said anchor, said locking and releasing means comprising a locking member slidably mounted on said brake shoe and spring means for urging said locking member into engagement with said knurled top surface.

6. A brake comprising a brake shoe having a brake lining, a rotatable brake drum, a torque-resisting member, means for moving said brake shoe into engagement with said brake drum, an adjustable anchor carried by said torque-resisting member adapted for engagement by said brake shoe, a pivotally mounted adjusting lever functioning as a pawl for adjusting said anchor, said adjustable anchor comprising an adjusting screw having a head provided with peripheral teeth adapted to be engaged by the adjusting lever pawl and provided with a top surface which is knurled, means connecting said adjusting lever to said brake shoe whereby movement of said brake shoe in one direction will move said adjusting lever to operative position with respect to said anchor, means mounted on said brake shoe normally locking said anchor to prevent adjustment thereof, and a lost motion connection between said brake shoe and locking means actuated by excessive movement of said brake shoe in the same direction for releasing said locking means to permit said adjusting lever to adjust said anchor, said locking and releasing means comprising a locking member, means for slidably mounting said locking member on said brake shoe, a spring for biasing said locking member into engagement with said knurled top surface, and a pin on said locking member engaging an aperture in said brake shoe for moving said locking member to inoperative position upon excessive movement of said brake shoe.

7. A brake comprising a brake shoe having a brake lining, a rotatable brake drum, a torque-resisting member secured to a stationary part of the brake, means for moving said brake shoe into engagement with said brake drum, an adjustable anchor carried by said torque-resisting member adapted for engagement by said brake shoe, a pivotally mounted adjusting lever functioning as a pawl for adjusting said anchor, means for pivotally mounting said adjusting lever on a stationary part of the brake, said anchor comprising a threaded member having a head provided with peripheral teeth adapted to be engaged by the adjusting lever pawl, and a top surface which is knurled, means connecting said adjusting lever to said brake shoe whereby movement of said brake shoe in a forward direction will move said adjusting lever to operative position with respect to the toothed head of said anchor, a locking member slidably mounted on said brake shoe and biased into engagement with the knurled surface of said head to prevent adjustment of said anchor, and a pin on said locking member engaging an aperture in said brake shoe for moving said locking member to inoperative position upon excessive movement of said brake shoe in a forward direction due to wear on the lining thereof.

8. A device as described in claim 7 in which the means connecting the adjusting lever to the brake shoe comprises a rod pivotally connected at one end to the brake shoe and having a head on the other end engaging an aperture in the adjusting lever, whereby movement of said rod in one direction will actuate said adjustnig lever.

9. A device as described in claim 7 in which the means connecting the adjusting lever to the brake shoe comprises a rod pivotally connected at one end to the brake shoe and slidably connected at the other end to said adjusting lever, whereby movement of said brake shoe in a forward direction will actuate said adjusting lever.

10. A device as described in claim 7 in which the locking member comprises a slidable member having a laterally extending portion engageable with the knurled surface of said anchor, a spring support engaged in an aperture in the brake shoe, a spring interposed between said spring support and said laterally extending portion of said slidable member to urge the latter toward said knurled surface, and a pin on said slidable member engaging said aperture for moving said slidable member to inoperative position upon excessive movement of said brake shoe in a forward direction.

References Cited in the file of this patent

UNITED STATES PATENTS 2,389,618      Goepfrich _____ Nov. 27, 1945